United States Patent
Kampf et al.

(10) Patent No.: US 6,679,075 B2
(45) Date of Patent: Jan. 20, 2004

(54) METHOD FOR ADJUSTING THE RECIRCULATING AIR FRACTION OF THE INLET AIR DELIVERED TO A VEHICLE PASSENGER COMPARTMENT

(75) Inventors: Hans Kampf, Korb (DE); Karl Lochmahr, Vaihingen/Enz (DE); Armin Britsch-Laudwein, Renningen (DE)

(73) Assignee: Behr GmbH & Co., Stuttgart (DE)

( * ) Notice: Subject to any disclaimer, the term of this patent is extended or adjusted under 35 U.S.C. 154(b) by 0 days.

(21) Appl. No.: 10/164,312

(22) Filed: Jun. 7, 2002

(65) Prior Publication Data

US 2002/0197949 A1 Dec. 26, 2002

(30) Foreign Application Priority Data

Jun. 9, 2001 (DE) .......................... 101 28 166

(51) Int. Cl.⁷ .............................. F25B 49/00; F24F 7/00
(52) U.S. Cl. ...................................... 62/176.6; 236/493
(58) Field of Search ...................... 62/176.6; 236/49.3, 236/44 A, 44 C; 454/229, 230, 233, 236

(56) References Cited

U.S. PATENT DOCUMENTS

| | | | |
|---|---|---|---|
| 4,478,049 A | * 10/1984 | Fukui et al. ................. | 62/179 |
| 5,549,152 A | * 8/1996 | Davis, Jr. et al. .............. | 65/201 |
| 5,570,838 A | * 11/1996 | Davis, Jr. et al. ........... | 236/49.3 |
| 5,775,406 A | * 7/1998 | Ghitea, Jr. .................. | 165/11.1 |
| 5,937,940 A | * 8/1999 | Davis, Jr. et al. ........... | 165/202 |
| 5,971,287 A | 10/1999 | Kettner et al. | |
| 6,067,808 A | * 5/2000 | Dage ........................... | 62/150 |
| 6,155,061 A | * 12/2000 | Davis, Jr. et al. ........... | 62/176.6 |
| 6,334,325 B1 | 1/2002 | Herpel et al. | |

FOREIGN PATENT DOCUMENTS

| | | |
|---|---|---|
| DE | 197 09 053 | 9/1998 |
| DE | 197 37 272 | 3/1999 |
| DE | 199 13 848 | 2/2000 |
| DE | 199 20 093 | 9/2000 |
| DE | 198 47 504 | 11/2000 |
| EP | 0 825 044 | 7/1997 |

* cited by examiner

Primary Examiner—Marc Norman
(74) Attorney, Agent, or Firm—Foley & Lardner

(57) ABSTRACT

Disclosed is a heating and/or air-conditioning system for a vehicle and a method for adjusting a recirculating air fraction of the inlet air delivered to a passenger compartment of a vehicle in order to avoid exceeding a predetermined limit value of at least one air parameter, in particular the carbon dioxide fraction and/or the humidity in the passenger compartment air. The method provides that one or more secondary parameters be obtained and analyzed for indirect determination of the air parameter, and that the recirculating air fraction be adjusted as a function of the analysis.

29 Claims, 5 Drawing Sheets

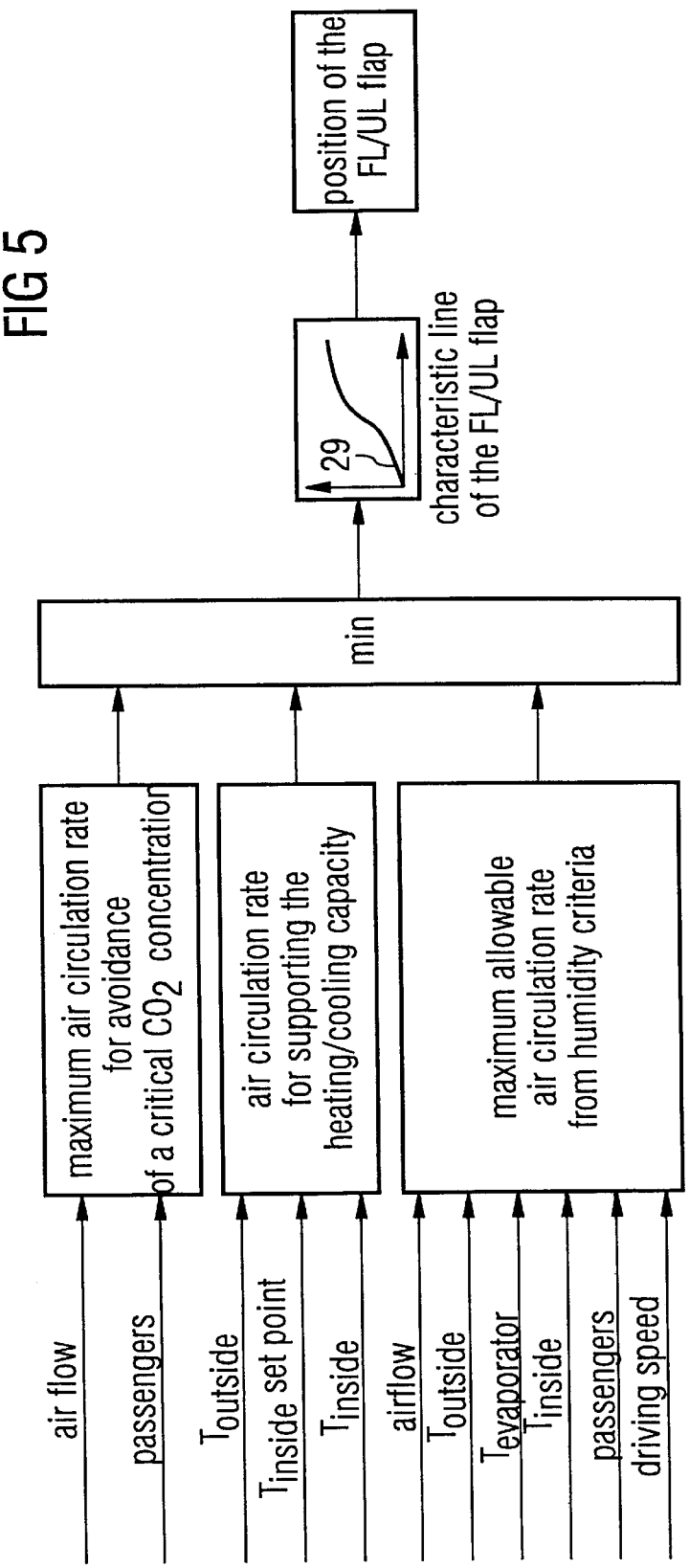

METHOD FOR ADJUSTING THE RECIRCULATING AIR FRACTION OF THE INLET AIR DELIVERED TO A VEHICLE PASSENGER COMPARTMENT

CROSS-REFERENCE TO RELATED PATENT APPLICATIONS

The right of priority under 35 U.S.C. §119(a) is claimed based on German Patent Application No. 101 28 166.8, filed Jun. 9, 2001, the entire disclosure of which is hereby incorporated by reference.

BACKGROUND OF THE INVENTION

The present invention relates to a method for adjusting a recirculating air fraction of inlet air delivered to a passenger compartment of a vehicle, and to an air-conditioning system for a vehicle.

In known heating and cooling/air-conditioning systems in vehicles, the flow of inlet air drawn in by a fan and then delivered to a passenger compartment can often be switched in continuous increments between outside air and the air present in the passenger compartment by an outside air/recirculating air adjustment device. This is done either by pressing a key on an operating control unit or by an automatic control as a function of the vehicle speed (dynamic pressure compensation) and/or as a function of a signal from a pollutant gas sensor. If a prolonged period of time is spent in the passenger compartment, there is a danger in the recirculating air mode, in which the inlet air is composed exclusively of air present in the passenger compartment, that an air mixture will form in the passenger compartment that is humid and deficient in oxygen, owing to the influence of the occupants. Such humidity may lead to fogging up of the vehicle windows or may cause the occupants to be uncomfortable. In the case of oxygen deficiency, it leads initially to an insidious deterioration in driving capability due to fatigue and lack of concentration. Except in regions having a tropical climate, therefore, the system is generally run with a relatively high outside air fraction. As a result, however, the heating and air-conditioning system has an increased power demand.

A known method of preventing an excessive concentration of pollutant gases and excessively high humidity in the passenger compartment air is to set the inlet air to a high outside air fraction, without measuring and taking account of the pollutant gas concentration and the humidity of the passenger compartment air for this purpose. Although heating/air-conditioning systems operating on this principle are inexpensive to manufacture, since they do not require any sensors for the pollutant gases and/or humidity in the passenger compartment air, they have a relatively high power consumption.

EP 0 825 044 A2 discloses a method for air mixture control in a heating/air-conditioning unit of a motor vehicle, in which the humidity of the passenger compartment air is measured by means of a sensor and the recirculating air fraction of the inlet air is adjusted as a function of this humidity. Also known is the use of gas sensors in order to determine the carbon dioxide content of the passenger compartment air. The disadvantage to these methods is the high cost of such sensors.

SUMMARY OF THE INVENTION

One object of the present invention is to provide an improved method for adjusting a recirculating air fraction of inlet air delivered to a passenger compartment of a vehicle, which permits a simple and hence inexpensive construction for a heating and cooling/air-conditioning system, which nevertheless provides performance advantages.

A further object of the invention is to provide an improved apparatus for adjusting a recirculating air fraction of inlet air delivered to a passenger compartment of a vehicle, as well as an improved heating and/or air-conditioning system and an improved vehicle embodying such an apparatus and system.

In accordance with one aspect of the present invention, there has been provided a method for adjusting a recirculating air fraction of inlet air delivered to a passenger compartment of a vehicle via an air-conditioning system, in order to avoid exceeding a predetermined limit value of at least one passenger compartment air parameter, comprising: determining at least one secondary parameter; from the at least one determined secondary parameter, indirectly determining the passenger compartment air parameter; and adjusting the recirculating air fraction as a function of the indirectly determined passenger compartment air parameter.

In accordance with another aspect of the invention, there is provided a device for adjusting a recirculating air fraction of inlet air delivered to a passenger compartment of a vehicle via an air-conditioning system, in order to avoid exceeding a predetermined limit value of at least one passenger compartment air parameter. The device comprises a system for determining at least one secondary parameter; a calculation device for indirectly determining the passenger compartment air parameter from the at least one determined secondary parameter; and a device for adjusting the recirculating air fraction as a function of the indirectly determined passenger compartment air parameter.

In accordance with yet another aspect of the invention, there has been provided a heating and/or air-conditioning system for a vehicle having a device for adjusting the recirculating air fraction of the inlet air delivered to a passenger compartment of the vehicle, wherein the device comprises a device of the type described above. A vehicle embodying such a heating and/or air-conditioning system is also provided according to the invention.

Further objects, features and advantages of the present invention will become apparent from the detailed description of preferred embodiments that follows, when considered together with the accompanying figures of drawing.

BRIEF DESCRIPTION OF THE DRAWINGS

In the drawings:

FIG. 5 is a diagram representing an embodiment of a control structure for adjusting the recirculating air fraction of the inlet air delivered to the passenger compartment.

DETAILED DESCRIPTION OF PREFERRED EMBODIMENTS

Figure 1:
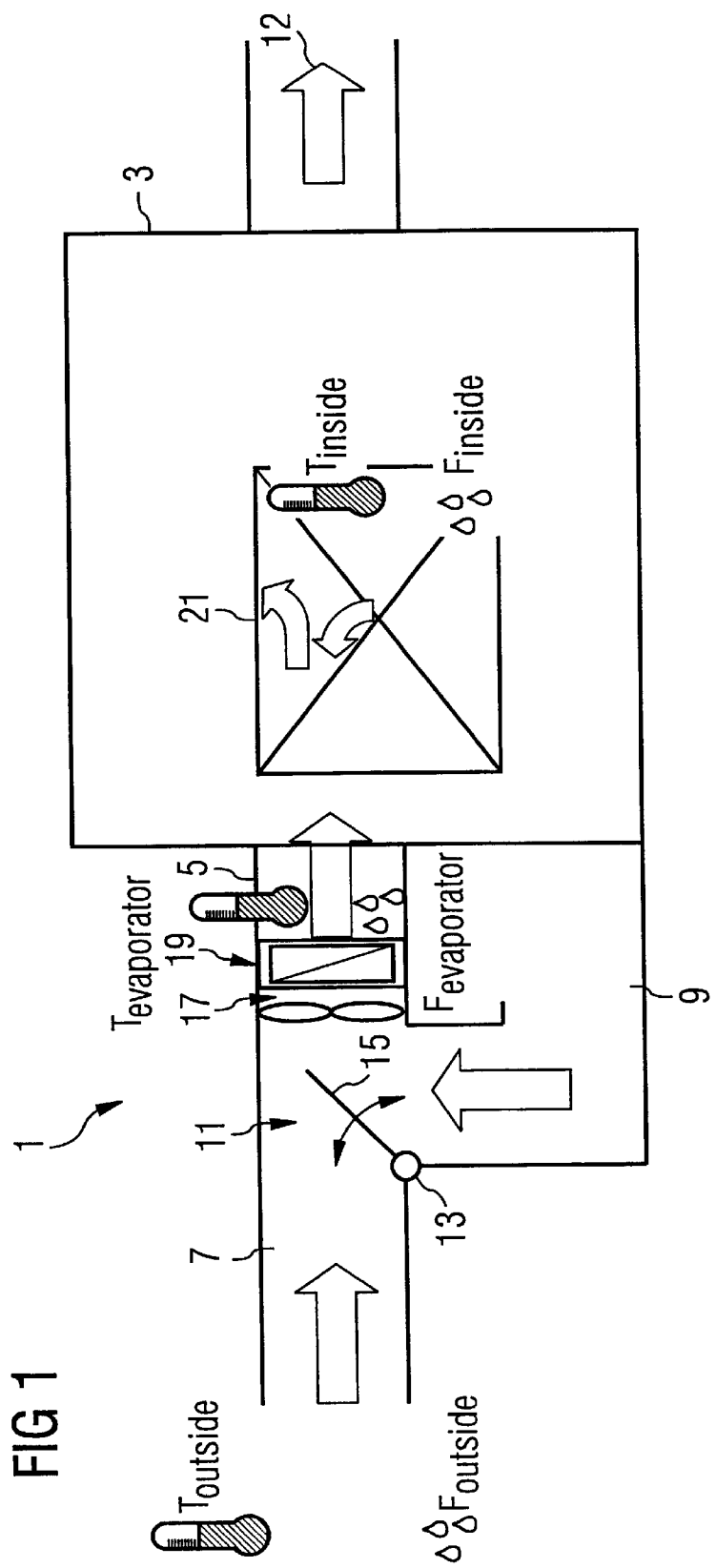
FIG. 1 is a schematic view showing a representation of an exemplary embodiment of a heating/cooling system for a vehicle according to the invention.

The method of the invention serves for adjustment of a recirculating air fraction of the inlet air delivered to a passenger compartment of a vehicle, in order to avoid exceeding a predetermined limit value of at least one air parameter of the passenger compartment air. This air parameter is, for example, the carbon dioxide content or the humidity. In the method, the secondary parameters are obtained (either through measurement, calculation and/or assumption) and analyzed for indirect determination of the air parameter, and the recirculating air fraction is adjusted as a function of the analysis. This air parameter of the passenger compartment air is therefore not measured directly by means of sensors, as provided in known methods, but is ascertained from predetermined and/or measured secondary parameters. Analysis of the secondary parameters in order to determine the required air parameter is preferably performed by means of a control facility, such as a microcomputer, for example. Where the air parameter in question is the carbon dioxide concentration or the humidity of the passenger compartment air, it is possible to dispense with expensive sensors for the direct measurement of these parameters, so that the costs of a heating and cooling/air-conditioning system for the vehicle can be reduced.

In an especially preferred embodiment of the method, at least the carbon dioxide fraction and the humidity of the passenger compartment air are determined indirectly by taking account of at least two of the secondary parameters in each case, and the recirculating air fraction of the inlet air is preferably set as high as possible as a function of these values of the passenger compartment air. This boosts the efficiency of the heating and cooling/air-conditioning system, so that a reduction in the primary energy consumption needed to operate the heating/air-conditioning system is possible. Furthermore, the humidity of the passenger compartment air can be raised to a level perceived as comfortable by the occupants. At the same time, however, the recirculating air fraction of the inlet air is always only just high enough to reliably preclude the occurrence of critical carbon dioxide concentrations in the passenger compartment air, which might lead to fatigue and loss of concentration on the part of the occupants, and to fogging up of the vehicle windows due to an excessively high air humidity in the passenger compartment.

The present invention also relates to a heating and/or air-conditioning system for a vehicle, which comprises a device for adjusting the recirculating air fraction of the inlet air delivered to a passenger compartment of the vehicle. The device is controllable/adjustable by means of a control facility, with the control facility operating in accordance with the above-described method.

The method described in more detail below serves for adjusting the recirculating air fraction of the inlet air delivered to a passenger compartment of a vehicle, so that the recirculating air fraction is just large enough to ensure that a limit value of, in this case, a total of two air parameters, namely, the carbon dioxide concentration and the humidity in the passenger compartment air, is not exceeded.

The inlet air is composed of outside air and air drawn from the passenger compartment, the latter of which is termed recirculating air. The outside air fraction and the recirculating air fraction of the inlet air together always give 100%, i.e., if the recirculating air fraction is, for example, 65% of the inlet air, this gives an outside air fraction of 35%.

In the context of the present invention, a vehicle is taken to mean, for example, a passenger car or a truck. The passenger compartment is the part of the interior of the vehicle that can be occupied by at least one occupant.

FIG. 1 shows a schematic representation of a section of an exemplary embodiment of a heating and air-conditioning system 1, which has an air passage 5 connected to a passenger compartment 3. To this passage outside air/fresh air can be delivered by way of a first duct 7 and recirculating air, i.e., air drawn from the passenger compartment 3, by way of a second duct 9. The air flow escaping from the passenger compartment 3 due to leakage is indicated by an arrow 12.

The heating/air-conditioning system 1 furthermore comprises a device 11 for adjusting the recirculating air fraction of the inlet air delivered to the passenger compartment 3, which in this case has a flap 15, which is pivotable about an axis 13 running perpendicular to the plane of projection of FIG. 1 and can be operated by means of a servomotor (not shown). The recirculating air fraction of the inlet air is increased or reduced according to the position into which the flap 15 is swiveled.

Downstream of the flap 15 in the direction of flow, there is arranged in the air passage 5 a fan 17, which can be driven by means of a drive (not shown). An evaporator 19, which is part of refrigeration system (not shown), is located downstream of the fan 17. A heating facility (not shown) for heating the inlet air cooled by the evaporator 19 is preferably located downstream of to the evaporator 19, viewed in the direction of flow of the inlet air. It is typically a heat exchanger that is coupled to the engine cooling system and circulates warm engine coolant for heat exchange with the cooled inlet air. The heat exchanger is preferably also arranged in the air passage 5. The inlet air composed of outside air and/or recirculating air, depending on the position of the flap 15, passes from the air passage 5 into the passenger compartment 3 by way of at least one opening and/or nozzle 21, that can generally be closed by means of flaps, vanes or the like.

The drives for the flap 15 and the fan 17, the adjustment of the evaporator temperature $T_{Evap}$, the heating facility and any other components of the heating and air-conditioning system 1 are actuated by a conventional control facility (not shown in detail).

A preferred embodiment of the method according to the invention is described in more detail below with reference to FIGS. 2 to 4. In the case of a stationary vehicle, the aim is to set the highest possible recirculating air fraction in order to boost the efficiency of the heating and air-conditioning system 1, especially in order to reduce its primary energy consumption, and/or to adjust the humidity of the passenger compartment air $F_{inside}$ to a level that is comfortable for an occupant of the passenger compartment 3. At the same time, however, the intention is to avoid a critical carbon dioxide concentration, in the case of a single occupant, which can lead to fatigue and lack of concentration, and an excessively high humidity, which can lead to fogging up of the vehicle windows. For this purpose, however, it is not intended either to use a gas sensor to determine carbon dioxide concentrations in the air or to use a sensor for determining the air humidity.

First, a maximum admissible recirculating air fraction of the inlet air is preferably determined, so as to avoid a critical carbon dioxide concentration of the air in the passenger compartment 3, which can be assumed to be 2%, for example. For this purpose, the maximum admissible carbon dioxide concentration for the passenger compartment air is used to calculate the maximum admissible mixing ratio for the inlet air drawn in by the fan 17, which is explained in more detail below with reference to the diagram represented in FIG. 2.

Figure 2:
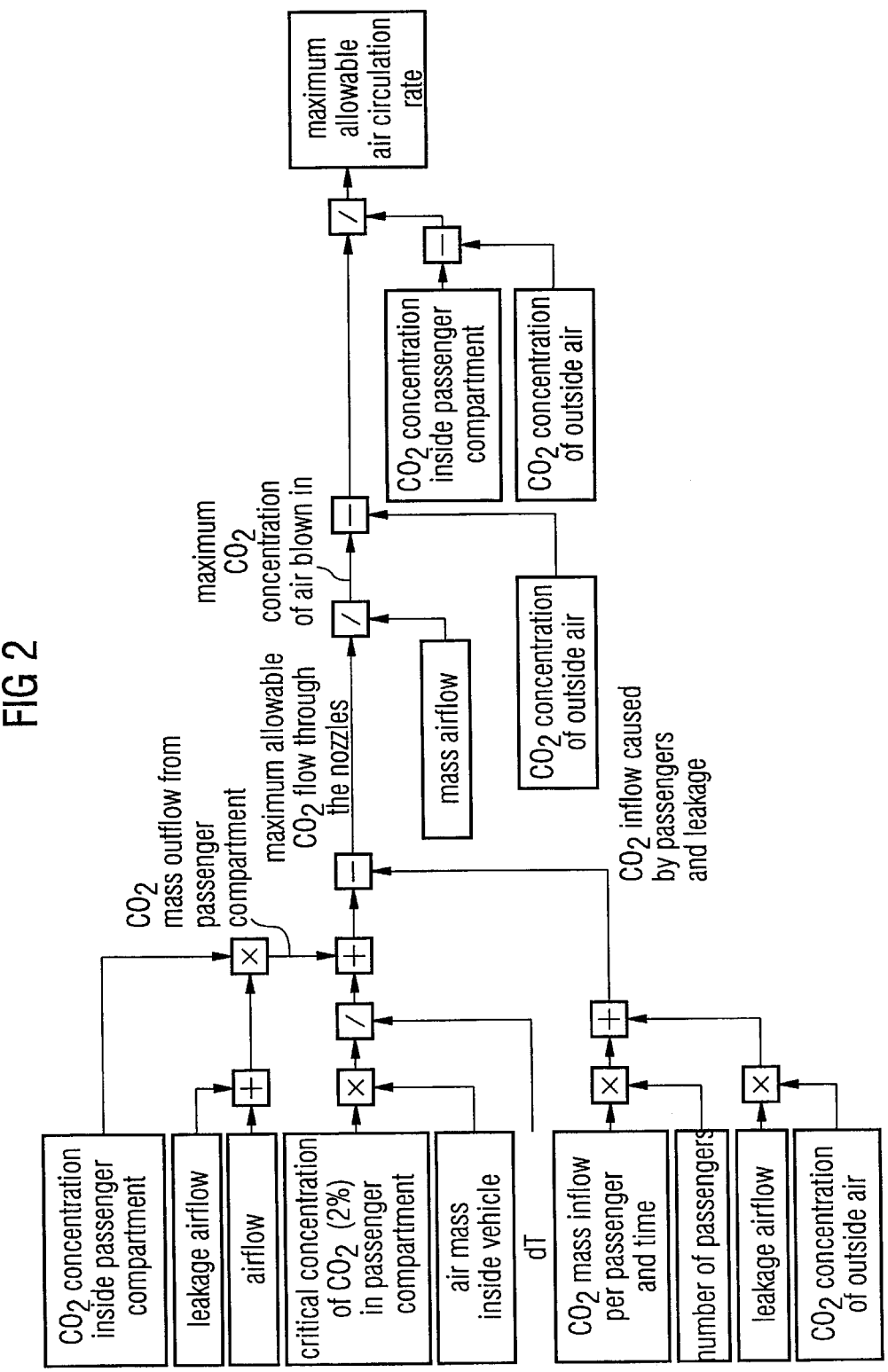
FIG. 2 is a calculation flow diagram of an embodiment of the calculation of a maximum admissible recirculating air fraction of the inlet air delivered to a passenger compartment from the indirectly determined carbon dioxide concentration of the passenger compartment air.
Figure 3:
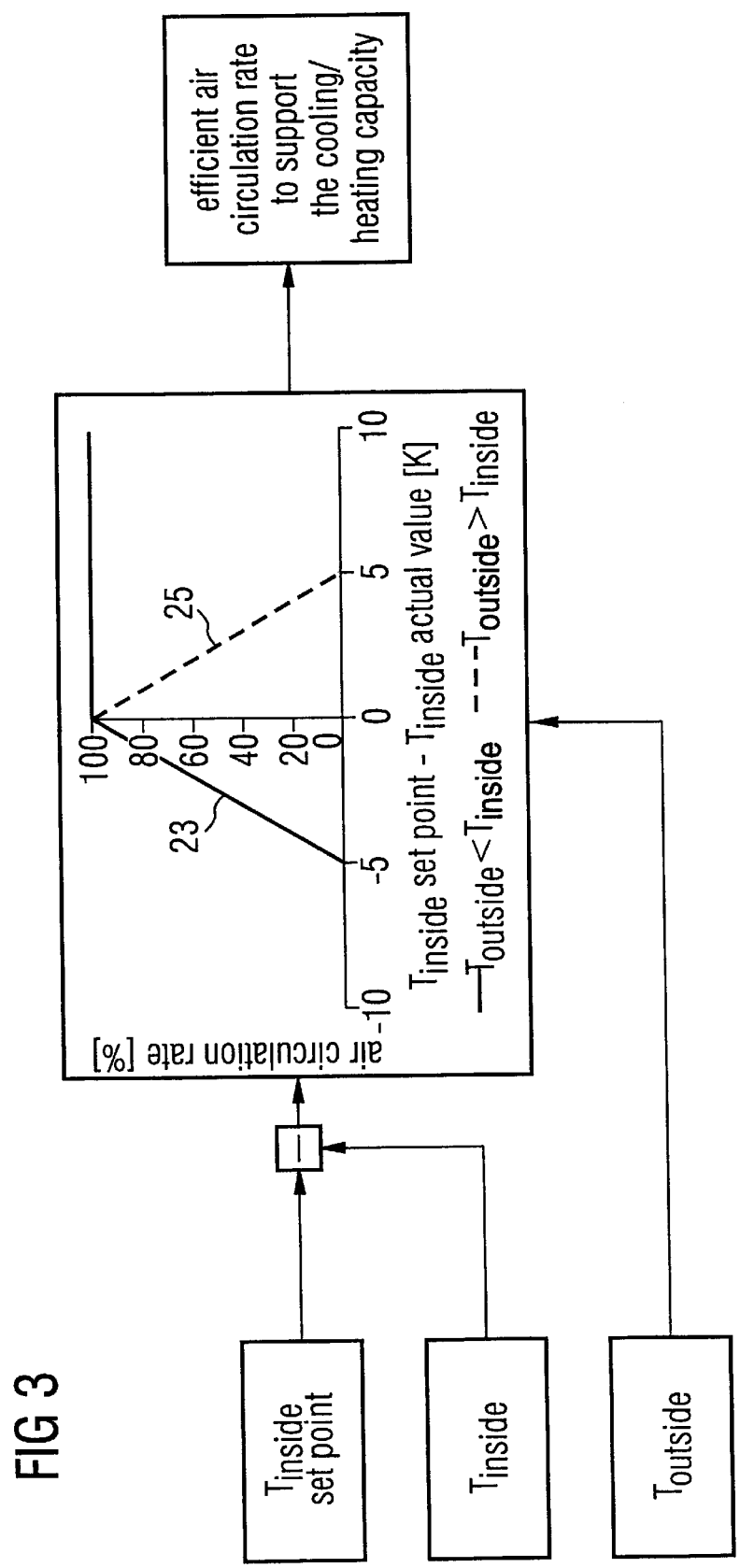
FIG. 3 is a diagram representing an embodiment for adjusting the recirculating air fraction of the inlet air in order to boost the efficiency of a heating/cooling facility.

As can be seen from FIG. 2, the carbon dioxide mass flow from the passenger compartment 3 is determined by adding together the leakage air flow indicated by arrow 12 in FIG. 1 and an air flow drawn from the passenger compartment 3 via the second duct 9, and multiplying the result by an assumed carbon dioxide concentration in the passenger compartment air. The assumed carbon dioxide concentration in the passenger compartment air may in straightforward cases be assumed to be equal to the critical carbon dioxide concentration, which this part of the control uses as target value. It is therefore not measured. In a second stage, the critical carbon dioxide concentration of the passenger compartment air is multiplied by the air mass present in the passenger compartment 3, and the result is then divided by the duration dT of a control stage and added to the carbon dioxide mass flow from the passenger compartment 3. In a third stage the carbon dioxide mass flow per occupant and unit time is multiplied by the number of occupants of the passenger compartment 3. The result of the multiplication of the leakage air flow and the carbon dioxide concentration of the outside air is then added to this in order to obtain the net carbon dioxide inlet flow into the passenger compartment caused by the occupants and leakage. This is subtracted from the carbon dioxide mass flow escaping from the passenger compartment, thereby giving the maximum admissible inlet flow of carbon dioxide through the openings 21 or nozzles into the passenger compartment 3. This is divided by the air mass flow of the inlet air, thereby giving a maximum carbon dioxide concentration in the inlet air delivered to the passenger compartment 3, from which in turn an assumed carbon dioxide concentration of the outside air is subtracted. For more reliable operation, an increased value is selected for the carbon dioxide concentration of the outside air, as can be measured, for example, in inner city traffic. In order to obtain the maximum admissible recirculating air fraction of the inlet air, the difference is finally calculated between the assumed carbon dioxide concentration in the passenger compartment air and the assumed carbon dioxide concentration of the outside air. The difference between the maximum carbon dioxide concentration in the air blown into the passenger compartment and the assumed carbon dioxide concentration of the outside air is divided by this result in order to obtain the maximum admissible recirculating air fraction of the inlet air, at which a critical carbon dioxide concentration of the passenger compartment air can be reliably avoided.

The number of occupants of the passenger compartment can be detected, for example, by seatbelt lock switches or a seat occupancy sensor known in the art, or in the simplest case assumed to be equal to the maximum permissible occupancy of the passenger compartment.

It will now be explained with reference to FIG. 3 how a suitable recirculating air fraction of the inlet air can be calculated, which boosts the cooling and heating capacity of the heating and air-conditioning system 1, in order to make better use of the potential energy saving. If the outside temperature $T_{outside}$ is less than the passenger compartment air temperature $T_{inside}$, it may be used to cool the passenger compartment 3. This is advantageous where the setting for the passenger compartment air temperature is less than the actual value of the passenger compartment air temperature measured by a sensor. The recirculating air fraction can then be determined from the diagram represented in FIG. 3 as a function of the temperature difference between the set/actual passenger compartment air temperature along a continuous first characteristic line 23. If the outside temperature $T_{outside}$ is greater than the temperature $T_{inside}$ of the passenger compartment air, however, it can be used for heating the passenger compartment air. This is the case where the setting for the passenger compartment air temperature $T_{inside}$ is greater than the measured actual value of the passenger compartment air temperature. The recirculating air fraction can in this case be taken from the diagram along a second characteristic line represented by a dashed line. In both cases the outside air fraction of the inlet air is increased continuously over the temperature differential, or the recirculating air fraction of the inlet air is reduced, as can be seen from the path of the characteristic lines 23 and 25 in FIG. 3.

Finally, a maximum admissible recirculating air fraction of the inlet air is calculated, in order to avoid excessively high humidity in the passenger compartment air. This is evaluated by way of a humidity limit for the avoidance of fogging and an uncomfortable humidity according to "Fanger" (humidity comfort index). As can be seen from the diagram according to FIG. 4, for this purpose the temperature on the inside of a window is first calculated, using a window temperature model, based on the speed of travel $V_{Travel}$, the outside temperature $T_{outside}$, the passenger compartment air temperature $T_{inside}$, the output of the fan 17 and the time. According to this calculated window temperature and the number of occupants, who contribute to an increase in the humidity of the passenger compartment air through their transpiration, a first set temperature for the evaporator 19 is calculated, which is needed in order to keep the humidity of the passenger compartment air to a level such that the vehicle windows cannot fog up. In this it is assumed that the relative humidity at the evaporator 19 is just less than 100%, particularly 90% to 95%. Heating the inlet air to the level of the passenger compartment air by means of the heating facility, arranged on the outlet side of the evaporator 19, then produces a drying of the inlet air according to the h-x diagram. For calculating the humidity comfort index a constant limit is assumed for the enthalpy of the passenger compartment air. Taking into account the insolation and any air stratification together with the passenger compartment air temperature, this enthalpy is then used to calculate the absolute humidity that needs to be set, from which the influence of the occupants again needs to be subtracted. This desired absolute humidity downstream of the evaporator 19 gives a second set temperature for the evaporator 19.

The term "air stratification" means the temperature of the inlet air admitted to the passenger compartment varies over the height of the latter. The inlet air delivered to the footwell of the passenger compartment usually has a higher temperature than the air flowing into the passenger compartment in the head area of the occupants.

The lesser of the two first and second evaporator set temperatures calculated is then compared with the actual temperature of the evaporator 19 measured by a sensor. If the actual temperature of the evaporator 19 is less than or equal to the set temperature determined, a recirculating air fraction of 100% can be run for adjustment to an acceptable humidity of the passenger compartment air. The greater the upward deviation of the actual temperature of the evaporator 19 from its set value, the more the outside air fraction needs to be increased as a precaution in order to ensure reliable operation, even when the refrigeration system is not in use.

Figure 4:
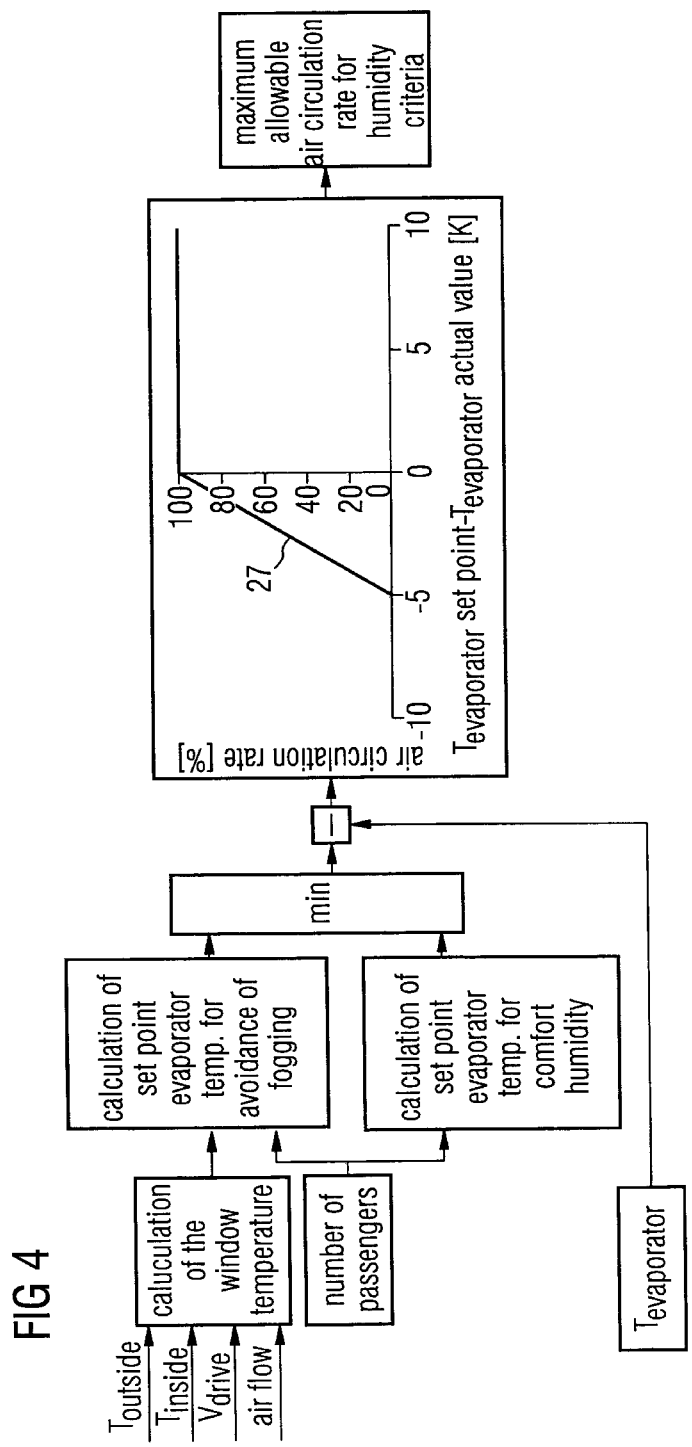
FIG. 4 is a diagram representing an embodiment for adjusting the recirculating air fraction of the inlet air in order to prevent a critical and/or uncomfortable air humidity in the passenger compartment.

FIG. 4 shows a diagram, in which the recirculating air fraction of the inlet air is plotted on the ordinate axis and the temperature differential between set and actual temperature of the evaporator 19 is plotted on the abscissa. A characteristic line 27, by means of which the recirculating air fraction can be determined as a function of the temperature differential, is drawn in on the diagram. The precise position of the characteristic line 27 can be evaluated along with the outside temperature, so that an excessively high outside air fraction of the inlet air is not needlessly set in tropical conditions, i.e., humid and hot conditions.

FIG. 5 shows an overview of the control structure for setting the highest possible recirculating air fraction of the inlet air, which takes account of (1) the aforementioned maximum recirculating air fraction of the inlet air determined for the avoidance of a critical carbon dioxide concentration in the passenger compartment air, (2) the appropriate recirculating air fraction for boosting the heating/cooling capacity of the heating/air-conditioning system 1, and (3) the maximum admissible recirculating air fraction for the avoidance of an excessively high humidity of the passenger compartment air. The smallest of the determined or calculated admissible recirculating air fractions of the inlet air is set by means of the device 11, the flap 15 in the exemplary embodiment described with reference to the figures being swiveled into a corresponding position according to its characteristic line 29 plotted by way of example in a diagram shown in FIG. 5. The characteristic line 29 represents the proportion of outside air/recirculating air flowing in the inlet air over the position of the flap 15.

The method described with reference to the figures is distinguished in that the recirculating air fraction of the inlet air can be advantageously controlled or regulated without the need for relatively expensive sensors for direct measurement of carbon dioxide concentrations and/or the humidity in the passenger compartment air.

For calculating the maximum admissible recirculating air fraction in order to avoid a critical concentration of carbon dioxide in the passenger compartment air, it was assumed at the start of the calculation, described with reference to FIG. 2, that the carbon dioxide concentration in the passenger compartment 3 is equal to the critical carbon dioxide concentration. Since, however, as explained with reference to FIG. 5, the device 11 does not necessarily set the maximum admissible recirculating air fraction for the avoidance of a critical carbon dioxide concentration, but if necessary one of the other suitable and/or permissible determined recirculating air fractions, it is possible, in order to provide a more sophisticated level of control, to provide a model of the carbon dioxide concentration of the passenger compartment air based on the current value. This model is virtually the reverse of the part of the control with the input variable "position of the outside air-recirculating air mimic" (flap 15) and the output variable "current carbon dioxide concentration in the passenger compartment air", as has been described with reference to FIG. 2. Instead of the maximum admissible recirculating air fraction, therefore, the recirculating air fraction actually set is used, and the calculation described with reference to FIG. 2 is reversed.

In an advantageous embodiment, the setting of the required recirculating air fraction and preferably also the calculations or determining stages described above are performed by means of the control/regulating facility for the heating and/or air-conditioning system. Another, possibly already existing, computer can obviously also be used for the calculations.

It will be noted, in summing up, that in order to determine the maximum admissible recirculating air fractions (FIGS. 2 and 4) and the appropriate recirculating air fraction (FIG. 3), a plurality of secondary parameters were used in each instance, which are sometimes measured by sensors already present in the vehicle or were adopted, i.e., established by assumption or from empirical values.

The advantages ensuing from the method according to the invention obviously also accrue where, instead of three recirculating air fractions, as described with reference to FIGS. 2 to 5, only one of the maximum admissible recirculating air fractions, for example, is determined and set.

The foregoing description of preferred embodiments of the invention has been presented for purposes of illustration and description only. It is not intended to be exhaustive or to limit the invention to the precise form disclosed, and modifications and variations are possible and/or would be apparent in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto and that the claims encompass all embodiments of the invention, including the disclosed embodiments and their equivalents.

What is claimed is:

1. A method for adjusting a recirculating air fraction of inlet air delivered to a passenger compartment of a vehicle via an air-conditioning system, in order to avoid exceeding a predetermined limit value of at least one passenger compartment air parameter, comprising:

determining at least one secondary parameter in a manner that does not include directly measuring said at least one passenger compartment air parameter or use of a relatively expensive sensor;

from the at least one determined secondary parameter, indirectly determining the passenger compartment air parameter; and adjusting the recirculating air fraction as a function of the indirectly determined passenger compartment air parameter.

2. A method as claimed in claim 1, wherein the at least one passenger compartment air parameter comprises at least one of the carbon dioxide content and/or the humidity in the passenger compartment air and wherein said determining is carried out in a manner that does not use a gas sensor to determine carbon dioxide concentration and/or does not use a sensor to determine passenger compartment air humidity.

3. A method as claimed in claim 1, wherein a first secondary parameter comprises a maximum admissible limit of the recirculating air fraction for avoiding a critical maximum carbon dioxide concentration in the passenger compartment.

4. A method as claimed claim 1, wherein a second secondary parameter comprises the outflow of carbon dioxide from the passenger compartment.

5. A method as claimed in claim 1, wherein a third secondary parameter comprises the input of carbon dioxide into the passenger compartment due to the respiration of at least one occupant.

6. A method as claimed in claim 1, wherein a fourth secondary parameter comprises the input of carbon dioxide into the passenger compartment due to leakage therein.

7. A method as claimed in claim 1, wherein a fifth secondary parameter comprises the number of occupants of the passenger compartment.

8. A method as claimed in claim 7, wherein the number of occupants is detected by means of at least one sensor, or is assumed to be equal to the maximum admissible occupancy of the passenger compartment.

9. A method as claimed in claim 8, wherein the at least one sensor comprises seatbelt lock switches or seat occupancy sensors.

10. A method as claimed in claim 1, wherein a sixth secondary parameter comprises carbon dioxide concentration in the outside air.

11. A method as claimed in claim 10, wherein the carbon dioxide concentration in the outside air comprises a constant value which is equal to a carbon dioxide concentration measurable in a high vehicle concentration traffic.

12. A method as claimed in claim 1, wherein the maximum admissible mixing ratio of recirculating air and outside air in the inlet air in order to avoid exceeding the critical maximum carbon dioxide concentration in the passenger compartment is determined as a function of multiple secondary parameters.

13. A method as claimed in claim 1, wherein a seventh secondary parameter comprises the actual air temperature in the passenger compartment and an eighth secondary parameter comprises the outside air temperature.

14. A method as claimed in claim 13, wherein a suitable recirculating air fraction for optimizing the energy consumption of a cooling/heating facility is determined as a function of the seventh and eighth secondary parameters together with a desired SET air temperature forming a ninth secondary parameter.

15. A method as claimed in claim 1, wherein a tenth secondary parameter comprises a predetermined limit equal to a maximum admissible limit for the recirculating air fraction in order to avoid an excessively high humidity of the passenger compartment air.

16. A method as claimed in claim 15, wherein the limit is selected so that window fogging and optionally an uncomfortable humidity determined according to "Fanger"/humidity comfort index are avoided.

17. Method as claimed in claim 1, wherein an eleventh secondary parameter comprises a temperature on the inside of at least one window of the vehicle.

18. A method as claimed in claim 17, wherein the window inside temperature is determined by means of a window temperature model based on the speed of travel, the outside air temperature, the passenger compartment air temperature, the output of a fan of the heating/cooling facility and the time.

19. A method as claimed in claim 1, comprising setting a first SET temperature of an evaporator of the heating/cooling facility, at which the humidity of the passenger compartment air is kept at a level such that the windows of the vehicle are free of fogging, said first SET temperature being determined as a function of the temperature detected on the inside of one window and the number of occupants present in the passenger compartment.

20. A method as claimed in claim 19, comprising selecting a constant value for the enthalpy of the passenger compartment air for determining a humidity comfort index, and using this enthalpy, while taking into account any insolation and any air stratification together with the passenger compartment air temperature, to calculate the absolute humidity of the inlet air downstream of the evaporator, from which the humidity influence of the occupants is optionally subtracted.

21. A method as claimed in claim 20, further comprising using a desired absolute humidity of the inlet air downstream of the evaporator to determine a second SET temperature of the evaporator, comparing the lesser temperature of the first and second SET temperatures of the evaporator with the measured ACTUAL temperature of the evaporator to produce a temperature differential, and determining the recirculating air fraction as a function of this temperature differential.

22. A method as claimed in claim 21, comprising setting a recirculating air fraction in the inlet air of up to 100%, when the ACTUAL temperature of the evaporator is less than or equal to the determined, lower SET temperature of the evaporator, whereby the humidity in the passenger compartment air does not reach a critical level.

23. A method as claimed in claim 21, comprising inversely adjusting the recirculating air fraction of the inlet air downwardly as the deviation of the ACTUAL temperature of the evaporator from the lower of the two SET temperatures increases.

24. A method as claimed in claim 1, wherein the recirculating air fraction in the air delivered to the passenger compartment is set at the smallest of the calculated admissible recirculating air fractions determined in order to avoid (a) a critical carbon dioxide concentration in the passenger compartment air and (b) exceeding of the predetermined limit for the humidity of the passenger compartment air, and optionally at a level which is suitable for boosting the heating/cooling capacity of the air-conditioning system.

25. A device for adjusting a recirculating air fraction of inlet air delivered to a passenger compartment of a vehicle via an air-conditioning system, in order to avoid exceeding a predetermined limit value of at least one passenger compartment air parameter, comprising:
  a system for determining at least one secondary parameter in a manner that does not include directly measuring said at least one passenger compartment air parameter or use of a relatively expensive sensor;
  a calculation device for indirectly determining the passenger compartment air parameter from the at least one determined secondary parameter; and
  a device for adjusting the recirculating air fraction as a function of the indirectly determined passenger compartment air parameter.

26. A heating and/or air-conditioning system for a vehicle having a device for adjusting the recirculating air fraction of the inlet air delivered to a passenger compartment of the vehicle, wherein the device comprises a device as claimed in claim 25.

27. A heating and/or air-conditioning system as claimed in claim 26, wherein the system for determining at least one secondary parameter comprises a sensor for measuring at least one parameter selected from the outflow of carbon dioxide from the passenger compartment, the influx of carbon dioxide into the passenger compartment due to leakage therein, the number of occupants of the passenger compartment, the actual air temperature in the passenger compartment and the outside air temperature.

28. A heating and/or air-conditioning system as claimed in claim 26, wherein at least one of the secondary parameters is selected from a maximum admissible limit of the recirculating air fraction for avoiding a critical maximum carbon dioxide concentration in the passenger compartment, the input of carbon dioxide into the passenger compartment due to the respiration of at least one occupant, carbon dioxide concentration in the outside air, a predetermined limit equal to a maximum admissible limit for the recirculating air fraction in order to avoid an excessively high humidity of the passenger compartment air, a temperature on the inside of at least one window of the vehicle, the absolute humidity of the inlet air downstream of the evaporator, and a temperature differential calculated by using a desired absolute humidity of the inlet air downstream of the evaporator to determine a second SET temperature of the evaporator and comparing the lesser temperature of first and second SET temperatures of the evaporator with the measured ACTUAL temperature of the evaporator.

29. A vehicle comprising a heating and/or air-conditioning system, wherein said system comprises a heating and/or air-conditioning system as claimed in claim 26.

* * * * *